Dec. 30, 1947.   E. W. CLARK   2,433,648
SPRING CONTROLLED INDEX REGISTERING PHOTOELECTRIC EXPOSURE METER
Filed March 10, 1944
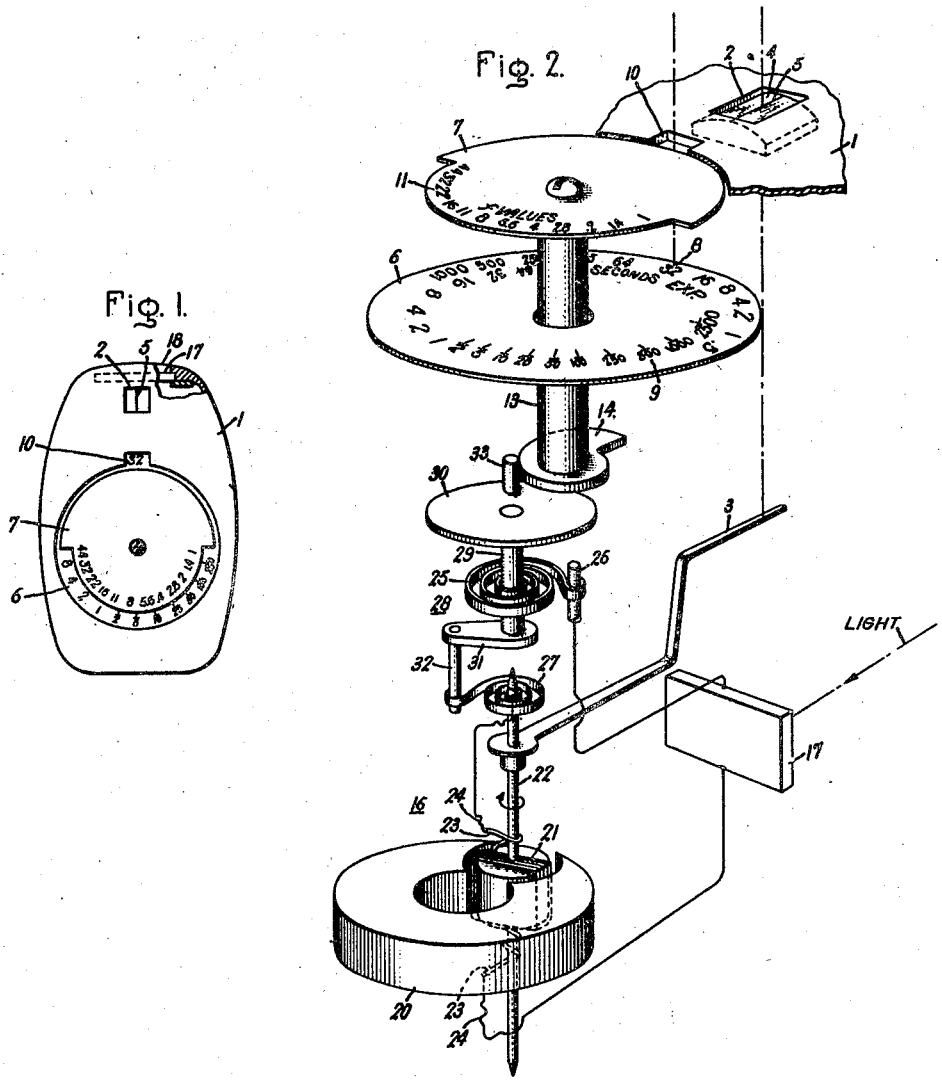
Inventor:
Earl W. Clark,
by Harry E. Dunham
His Attorney.

Patented Dec. 30, 1947

2,433,648

UNITED STATES PATENT OFFICE 2,433,648

SPRING CONTROLLED INDEX REGISTERING PHOTOELECTRIC EXPOSURE METER

Earl W. Clark, West Lynn, Mass., assignor to General Electric Company, a corporation of New York Application March 10, 1944, Serial No. 525,813

3 Claims. (Cl. 88—23)

My invention relates to exposure meters and it has for its object the provision of an improved form of exposure meter which is simple and rugged in construction, reliable in operation, inexpensive to manufacture, and unusually simple to use.

My invention will be better understood from the following description taken in connection with the accompanying drawing and its scope will be pointed out in the appended claims.

Referring to the drawing, Fig. 1 is a top view of one embodiment of my invention and Fig. 2 is a view drawn to a larger scale showing the operating mechanism thereof.

The exposure meter which I have devised has an enclosing casing 1 preferably shaped to be held conveniently in the hand and of a size that may readily be carried in the pocket. In the upper face of the casing is the window 2 through which the pointer 3 is observed. To maintain the window closed and to facilitate seeing the pointer beneath it the cylindrical magnifying lens 4 is mounted therein. The lens has the reference line 5 extending through the middle of the upper surface thereof.

At the upper face of the casing are the two rotatable friction-tight dials 6 and 7 each adapted to be adjusted by the operator when using the meter. The lower dial 6 which may be guided in the casing in any suitable manner, as for example by a recess in the upper face of the casing into which the dial loosely fits, has inscribed on its face in an arc adjacent to the periphery data 8 representing film speeds. On the same face of the dial 6 and in an arc within the arc of the data there is inscribed data 9 representing exposure times. The casing 1 is provided with the notch 10 adjacent to the dial 7 through which a datum of film speed on the dial 6 may be read. The upper dial 7 which overlies and is immediately above the dial 6 has parts of two different diameters both concentric therewith, the larger part covering a part of the data 9 but not covering the data 8 and the smaller part exposing a part of the data 9 to view. That part of the dial 7 of smaller diameter has data 11 thereon of "f" values arranged adjacent to its periphery. The dial 7 is fixed to the upper end of the rotatably mounted shaft 13, to the lower end of which is fixed the cam 14.

The exposure meter which I have devised is provided with the microammeter 16 and with the photoelectric device 17, the latter preferably being mounted in or behind the window (not shown) in the end face 18 of the casing. The microammeter is illustrated as being of the D'Arsonval type having the permanent magnet 20 between the poles of which rotates the winding 21 carried by the shaft 22. The ends of the winding connect through the terminals 23 on the shaft and the flexible connectors 24, 25, and 27 with the terminals of the photoelectric device. The pointer 3 is secured to the shaft 22 and is arranged to swing past and close beneath the window 2. When the microammeter is energized as a result of light shining on the photoelectric device the shaft 22 is rotated in a clockwise direction as indicated by the arrow against the force of the restraining spring 27. The tension of this spring is arranged to be varied by movement of the dial 7. This is effected through the rotatably mounted member 28 comprising the shaft 29 to which are fixed the disk 30 and the arm 31. The arm carries the pin 32 which is engaged by the spring 27 and the disk has the pin 33 positioned to press against the face of the cam 14 whereby as the cam is rotated in a counter-clockwise direction the tension of the spring 27 is increased by its being wound tighter. Suitable stops obviously are provided, although not illustrated, for the pointer, thereby to limit its movement within view of the window opening 2. The restraining spring 25 which has considerably more torque than the instrument spring 27, insures contact at all times between the cam 14 and the pin 33 which cooperates therewith.

In the use of the exposure meter to obtain data by which to set the diaphragm and the shutter speed control of a camera, the dial 6 first will be rotated by the operator until the number representing the speed of the film being used appears in the window 10. With the meter held in a position such that the photoelectric device thereof receives light from the object to be photographed the dial 7 will be rotated in one direction or the other until the pointer is brought to a position immediately below the reference line 5 in the window 2. With the dial 7 in this position relative to the dial 6 the alignment of readings on the "f" scale 11 and the shutter speed scale 9 enable one to select any one of many combinations of diaphragm opening and shutter speed. As the dials 6 and 7 are friction-tight a setting once obtained will be retained until manually readjusted.

What I claim as new and desire to secure by Letters Patent of the United States, is:

1. An exposure meter comprising a photoelectric device, a microammeter connected to be energized thereby having resilient means for opposing the resulting movement of its movable member, a plurality of relatively movable members having cooperating scales indicating different exposure factors, and means including a cam operatively connecting one of said scale members with said resilient means whereby a movement of said one scale member is accompanied by a variation in the tension of said resilient means.

2. An exposure meter comprising a photoelectric device, a microammeter having an indicator and resilient means for opposing the deflection of said indicator, a plurality of relatively movable scale plates having cooperating scales indicating different exposure factors, and a cam connection between said resilient means and one of said plates whereby when said one plate is moved to cause said indicator to have a predetermined deflection said scales indicate various combinations of the exposure factors appearing thereon.

3. An exposure meter comprising an enclosing casing having a window provided with an index line, a microammeter mounted in said casing having a pointer arranged when deflected to move past said window and having a spring for opposing the deflection of said pointer, a photoelectric device connected to energize said microammeter, a plurality of plates movably mounted on said casing, one of said plates having a film speed scale and a shutter speed scale, the other of said plates having an "f" scale arranged to cooperate with said shutter speed scale, and a connection including a cam between said other plate and said spring whereby said pointer may be brought to register with said index line by movement of said other plate.

EARL W. CLARK.

REFERENCES CITED

The following references are of record in the file of this patent:

UNITED STATES PATENTS

| Number | Name | Date |
|---|---|---|
| 2,091,762 | Kuppenbender | Aug. 31, 1937 |
| 2,329,630 | Lingel | Sept. 14, 1943 |

FOREIGN PATENTS

| Number | Country | Date |
|---|---|---|
| 522,920 | Great Britain | July 1, 1940 |
| 541,774 | Great Britain | Dec. 11, 1941 |
| 156,952 | Austria | Sept. 11, 1939 |